United States Patent [19]

Henderson

[11] Patent Number: 4,784,631

[45] Date of Patent: *Nov. 15, 1988

[54] BELT TENSIONER AND METHOD OF MAKING THE SAME

[75] Inventor: Dewey D. Henderson, Springfield, Mo.

[73] Assignee: Dayco Products, Inc., Dayton, Ohio

[*] Notice: The portion of the term of this patent subsequent to Jun. 24, 2003, as been disclaimed.

[21] Appl. No.: 118,901

[22] Filed: Nov. 9, 1987

Related U.S. Application Data

[62] Division of Ser. No. 7,255, Jan. 27, 1987, Pat. No. 4,728,318, which is a division of Ser. No. 827,572, Feb. 7, 1986, Pat. No. 4,661,087, which is a division of Ser. No. 643,504, Aug. 23, 1984, Pat. No. 4,596,538.

[51] Int. Cl.⁴ .................................. F16H 7/12
[52] U.S. Cl. ......................... 474/135; 474/117
[58] Field of Search ............. 474/101, 119, 111, 117, 474/133, 135, 139, 148, 136, 138

[56] References Cited

U.S. PATENT DOCUMENTS

| | | | |
|---|---|---|---|
| 2,753,724 | 7/1956 | Leyer et al. | 474/109 |
| 3,413,866 | 12/1968 | Ford | 474/138 |
| 4,299,584 | 12/1979 | Sproul | 474/135 |
| 4,351,636 | 9/1982 | Hager | 474/135 |
| 4,362,525 | 12/1982 | Sproul | 474/117 |
| 4,464,147 | 8/1984 | Foster | 474/135 |
| 4,472,162 | 9/1984 | Hitchcock | 474/117 X |
| 4,473,362 | 9/1984 | Thomey et al. | 474/135 |
| 4,536,172 | 8/1985 | Burris et al. | 474/135 |
| 4,596,538 | 6/1986 | Henderson | 474/135 |

Primary Examiner—Thuy M. Bui
Attorney, Agent, or Firm—Joseph V. Tassone

[57] ABSTRACT

A tensioner for a power transmission belt that is adapted to be operated in an endless path and a method of making the same are provided, the tensioner comprising a support unit for being fixed relative to the belt, a belt engaging unit carried by the support unit and being movable relative thereto, and a mechanical spring unit operatively associated with the support unit and the belt engaging unit for urging the belt engaging unit relative to the support unit and against the belt with a force to tension the belt. The spring unit has a longitudinal axis and is spiraled about the axis thereof. The support unit comprises a shaft unit having a longitudinal axis and is fixed from movement relative to the belt engaging unit, the belt engaging unit having a portion thereof rotatably carried by the shaft unit so as to rotate relative to the shaft unit. The support unit comprises a cup-shaped casing having an open end and receiving the spring unit therein. An antifriction disc-like member is disposed on the shaft unit between the portion of the belt engaging unit and the spring unit, the disc-like member substantially sealing closed the open end of the casing whereby the disc-like member performs a dual function.

1 Claim, 7 Drawing Sheets

BELT TENSIONER AND METHOD OF MAKING THE SAME

CROSS REFERENCE TO RELATED APPLICATIONS

This application is a divisional patent application of its copending parent patent application, Ser. No. 7,077,255, filed Jan. 27, 1987, now U. S. Pat. No. 4,728,318, which, in turn, is a divisional patent application of its copending parent patent application, Ser. No. 827,572, filed Feb. 7, 1986, now U. S. Pat. No. 4,661,087, which, in turn, is a divisional patent application of its copending parent patent application, Ser. No. 643,504, filed Aug. 23, 1984, now U.S. Pat. No. 4,596,538.

BACKGROUND OF THE INVENTION

1. Field of the Invention

This invention relates to an improved tensioner for an endless power transmission belt or the like and to a method of making such a tensioner.

2. Prior Art Statement

It is known to provide a tensioner for a power transmission belt that is adapted to be operated in an endless path, the belt tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and frictional dampening means operatively associated with the support means and the belt engaging means to dampen the movement of the belt engaging means relative to the support means in at least one direction of movement thereof. The dampening means has a longitudinal axis and the support means comprises a shaft means having a longitudinal axis and being fixed from movement relative to the belt engaging means. The belt engaging means has a portion thereof rotatably carried by the shaft means so as to rotate relative to the shaft means. For example, see the U.S. Pat. No. 4,362,525 to Sproul; the U.S. Pat. No. 4,351,636 to Hagger; the U.S. Pat. No. 4,299,584 to Sproul; the U.S. Pat. No. 3,413,866 to Ford and the U.S. Pat. No. 2,753,724 to Leyer et al.

It is also known to applicant to provide a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and dampening means operatively associated with the support means and the belt engaging means to dampen the movement of the belt engaging means relative to the support means in at least one direction of movement thereof. The dampening means has a longitudinal axis and the spring means has a longitudinal axis and is spiraled about the axis thereof. The support means comprises a shaft means having a longitudinal axis and is fixed from movement relative to the belt engaging means, the shaft means carrying the dampening means and the spring means in spaced apart side-by-side relation thereon with the axis of the shaft means being substantially coaxial with the axes of the dampening means and the spring means whereby the dampening means and the spring means are coaxially spaced apart and are coaxially aligned by the shaft means. The belt enaging means has a portion thereof disposed between the dampening means and the spring means and is rotatably carried by the shaft means so as to rotate relative to the shaft means whereby the dampening means and the spring means are coaxially spaced apart from each other by the portion of the belt engaging means. For example, see the copending patent application of James K. Brew et al, Ser. No. 581,645, filed Feb. 21, 1984, now U.S. Pat. No. 4,536,172, and the copending patent application of Randy C. Foster, Ser. No. 633,154, filed July 20, 1984 now U.S. Pat. No. 4,624,652.

It was found that in the tensioner as set forth in the aforementioned copending patent application Ser. No. 581,645 or Ser. No. 633,154, while having a rotary fluid dampening unit being utilized in connection therewith, the rotary dampening unit additionally frictionally dampened the movement of the belt engaging means relative to the support means because of the friction created between the relatively moving parts thereof and such frictional dampening increased the tighter the parts thereof were forced together during the assembly thereof.

Also, another known tensioner has the torsion spring thereof under axial compression to axially force the belt engaging arm away from the spring housing and against a stationary friction disc surface whereby the side of the belt engaging arm rubs against such friction surface under the force of the torsion spring during movement of the arm relative to the support means of the tensioner for dampening purposes.

It is also known to applicant to provide a tensioner for a power transmission belt that is adapted to be operated in an endless path, the tensioner comprising a support means for being fixed relative to the belt, a belt engaging means carried by the support means and being movable relative thereto, and mechanical spring means operatively associated with the support means and the belt engaging means for urging the belt engaging means relative to the support means and against the belt with a force to tension the belt. The spring means has a longitudinal axis and is spiraled about the axis thereof. The support means comprises a shaft means having a longitudinal axis and is fixed from movement relative to the belt engaging means. The belt engaging means has a portion thereof rotatably carried by the shaft means so as to rotate relative to the shaft means, the portion of the belt engaging means having a slot therein. The spring means has an inner coil provided with an inner end bent at an angle relative to the inner coil and is received in the slot to interconnect the spring means to the portion of the belt engaging means. For example, see the aforementioned two copending patent applications, Ser. No. 581,645 now U.S. Pat. No. 4,536,172 and Ser. No. 633,154 now U.S. Pat. No. 4,624,652.

SUMMARY OF THE INVENTION

It is one feature of this invention to provide a belt tensioner having improved means for frictionally dampening movement of the belt engaging means thereof relative to the support means thereof.

In particular, it was found that in the tensioner as set forth in the aforementioned copending patent application Ser. No. 581,645 now U.S. Pat. No. 4,536,172 or Ser. No. 391,643, now abandoned while having a rotary fluid dampening unit being utilized in connection therewith, the rotary dampening unit additionally frictionally dampened the movement of the belt engaging means relative to the support means because of the friction created between the relatively moving parts thereof and such frictional dampening increased the tighter the parts thereof were forced together during the assembly thereof.

Thus, it was found according to the teachings of this invention that a frictional dampening means could be utilized in place of the rotary fluid dampening means to provide the sole dampening force for dampening the movement of the belt engaging means relative to the support means and that such frictional dampening means could comprise a pair of frictionally engaging parts one part of which comprises an annular pad of friction material that is coaxially disposed and axially movable on the shaft means of the tensioner relative to the other part and another spring means that urges that one part against the other part with a certain spring force. Such an arrangement readily permits the annular part of the dampening means to self-align against its cooperating part so as to maintain full contact therewith, even with normal wear of the various members of the tensioner as will be apparent hereinafter.

For example, one embodiment of this invention provides a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and frictional dampening means operatively associated with the support means and the belt engaging means to dampen the movement of the belt engaging means relative to the support means in at least one direction of movement thereof. The dampening means has a longitudinal axis and the support means comprises a shaft means having a longitudinal axis and being fixed from movement relative to the belt engaging means. The belt engaging means has a portion thereof rotatably carried by the shaft means so as to rotate relative to the shaft means. The dampening means comprises a pair of frictionally engaging parts one part of which comprises an annular pad of friction material that is coaxially disposed and axially movable on the shaft means relative to the other part and another spring means that urges the one part against the other part with a certain spring force.

It is another feature of this invention to provide means for protecting the inner coil of the spiraled mechanical spring means of a belt tensioner.

In particular, it was found according to the teachings of this invention that the inner bent end of the spiraled mechanical spring means of a belt tensioner that is received in a slot means of a portion of the belt engaging means to interconnect that inner end to that portion of the belt tensioner tended to adversely flex the inner coil of the spring means as it bridged the joint area between that bent end and the inner coil of the spring whereby adverse wear occurred in such bridging area of the inner coil.

However, it was found according to the teachings of this invention that a protective shield can be disposed between the portion having the slot therein and the first coil of the spring adjacent to the bent end thereof to tend to prevent such adverse bridging arrangement.

For example, another embodiment of this invention provides a tensioner for a power transmission belt that is adapted to be operated in an endless path, the tensioner comprising a support means for being fixed relative to the belt, a belt engaging means carried by the support means and being movable relative thereto, and mechanical spring means operatively associated with the support means and the belt engaging means for urging the belt engaging means relative to the support means and against the belt with a force to tension the belt. The spring means has a longitudinal axis and is spiraled about the axis thereof. The support means comprises a shaft means having a longitudinal axis and is fixed from movement relative to the belt engaging means. The belt engaging means has a portion thereof rotatably carried by the shaft means so as to rotate relative to the shaft means, the portion of the belt engaging means having a slot therein. The spring means has an inner coil provided with an inner end bent at an angle relative to the inner coil and is received in the slot to interconnect the spring means to that portion of the belt engaging means. A protective member is disposed between the portion of the belt engaging means and the inner coil of the spring means adjacent the inner end thereof to tend to protect the inner coil.

It is another feature of this invention to provide means to protect the mechanical spring means of a belt tensioner.

In particular, it was found according to the teachings of this invention that the anti-friction disc for protecting the coiled spring and the pivot arm from each other could be utilized to substantially seal closed the cup-shaped housing that contains the coiled spring therein.

For example, another embodiment of this invention provides a tensioner for a power transmission belt that is adapted to be operated in an endless path, the tensioner comprising a support means for being fixed relative to the belt, a belt engaging means carried by the support means and being movable relative thereto, and mechanical spring means operatively associated with the support means and the belt engaging means for urging the belt engaging means relative to the support means and against the belt with a force to tension the belt. The spring means has a longitudinal axis and is spiraled about the axis thereof. The support means comprises a shaft means having a longitudinal axis and is fixed from movement relative to the belt engaging means, the belt engaging means having a portion thereof rotatably carried by the shaft means so as to rotate relative to the shaft means. The support means comprises a cup-shaped casing having an open end and receiving the spring means therein. An antifriction disc-like member is disposed on the shaft means between the portion of the belt engaging means and the spring means, the disc-like member substantially sealing closed the open end of the casing.

Accordingly, it is an object of this invention to provide an improved tensioner for a power transmission belt or the like that it is adapted to be operated in an endless path, the tensioner of this invention having one or more of the novel features of this invention as set forth above or hereinafter shown or described.

Another object of this invention is to provide an improved method of making such a tensioner, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as providing a belt tensioner for a particular power transmission belt of a particular motor vehicle engine, it is to be understood that the various features of this invention can be utilized singly or in any combination thereof to provide a belt tensioner for other arrangements as desired.

Therefore, this invention is not to be limited to only the embodiments illustrated in the drawings, because the drawings are merely utilized to illustrate one of the wide variety of uses of this invention.

Figure 1:
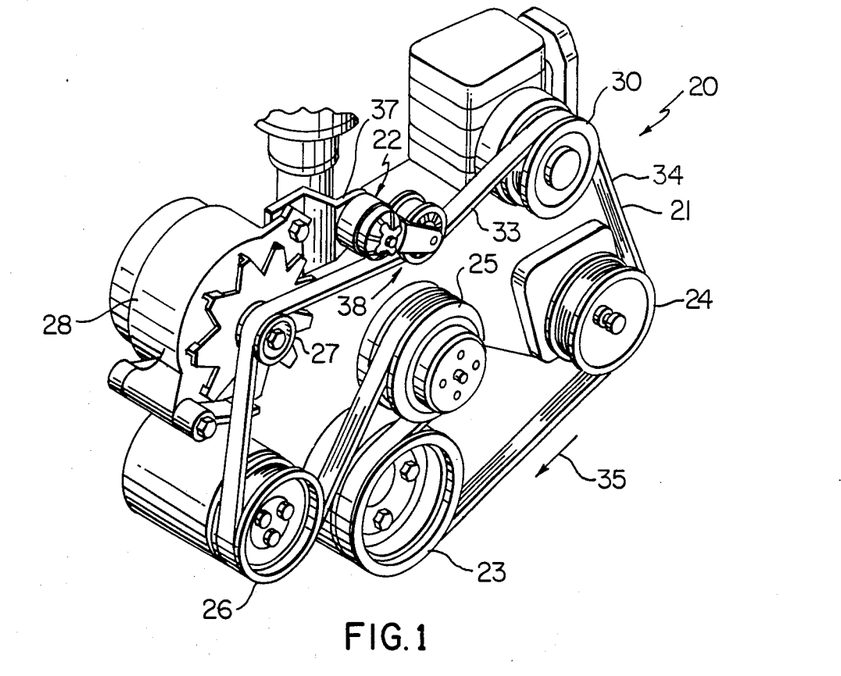
FIG. 1 is a fragmentary isometric view looking toward the front end of an automobile engine which utilizes the belt tensioner of this invention.
Figure 2:
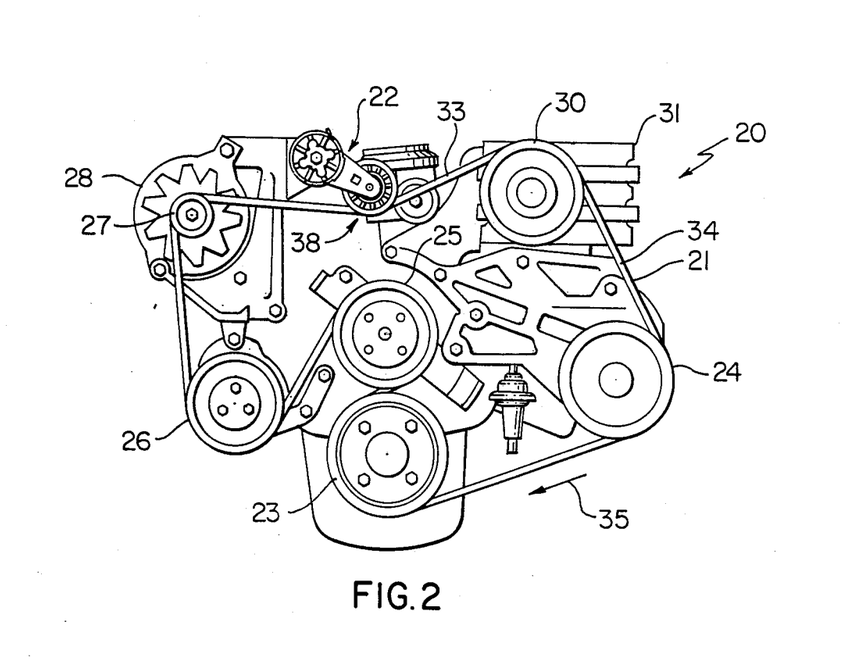
FIG. 2 is a view looking perpendicularly toward the front end of the automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, the improved belt tensioner of this invention being generally indicated by the reference numeral 22 and being utilized to provide a tensioning force on the belt 21 in a manner hereinafter set forth.

The endless power transmission belt 21 may be of any suitable type known in the art and is preferably made primarily of a polymeric material because the unique features of the tensioner 22 of this invention readily permit the tensioner 22 to tension a belt having a polyester load-carrying cord in an efficient manner as hereinafter described.

The belt 21 is driven by a driving sheave 23 which is operatively interconnected to the crankshaft of the engine 20 in a manner well known in the art. The driving sheave 23 drives the belt 21 in an endless path and thereby drives a sheave 24 of a power steering device used in an automobile (not shown) utilizing the engine 20, a sheave 25 of an engine water pump, a sheave 26 of an air pump of a type used in an antipollution system for the engine 20, a sheave 27 of an engine electrical alternator 28, and a sheave 30 of a compressor 31 of an air conditioning system for the automobile utilizing the engine 20.

All of the driven accessories, through their sheaves 24, 25, 26, 27 and 30, impose a load on the belt 21. However, only the detailed description of the load being imposed by the compressor 31 and its sheave 30 on the belt 21 will be hereinafter described inasmuch as such load is generally of a comparatively high magnitude.

In particular, the compressor 31, upon being driven, creates a slack side 33 and a tight side 34 in the belt 21 upon turning on of the air conditioner system in the automobile, the slack side 33 and tight side 34 being produced since the belt is rotating clockwise as indicated by the arrow 35 in FIGS. 1 and 2.

The belt tight side 34 (and hence, slack side 33) varies in tightness, i.e., magnitude of tightness, in a cyclic manner and as a function of the inherent cyclic change in the loads imposed by the air compressor 31. This cyclic change and load varies between greater extremes in applications where the compressor 31 is of a piston type. The cyclic load imposed by the compressor 31 has a tendency to cause the slack side 33 of the belt 21 to vibrate or oscillate.

In addition to such vibrations and oscillations of the belt 21, it is known that normal belt wear and heat variations in the engine compartment for the engine 20 produce variations in the length of the belt 21 that require compensation for the same.

Thus, it is known that it is difficult to maintain such a belt 21 under tension with a force required to insure non-slipping engagement and driving of the driven sheaves whereby numerous belt tensioners have been proposed and used heretofore in an effort to provide the required tension.

For example, in automotive accessory belt drives, it is necessary to provide the correct belt tension to control tension ratio throughout the life of the belt. With the advent of the single belt V-ribbed drive system, such as illustrated in FIGS. 1 and 2, this is of increasing importance since belts are longer and some accessories are driven off the back of the belts as a flat belt drive. Automatic tensioners of various descriptions have been developed but none include an independent means of external dampening to enable tuning the system to remove input torsionals and prevent natural harmonics while allowing the tensioner to respond to changes in belt tension requirements.

It is believed that the improved belt tensioner 22 of this invention functions in a manner to provide a proper tensioning force on the belt 21 to overcome the aforementioned problems, namely, provides the required tension in the overall belt 21 as well as prevents any tendency of the belt to oscillate in an undesirable manner as a result of the cyclic load change imposed by the compressor 31 whereby the improved belt tensioner 22 of this invention will now be described.

Figures 5, 6:
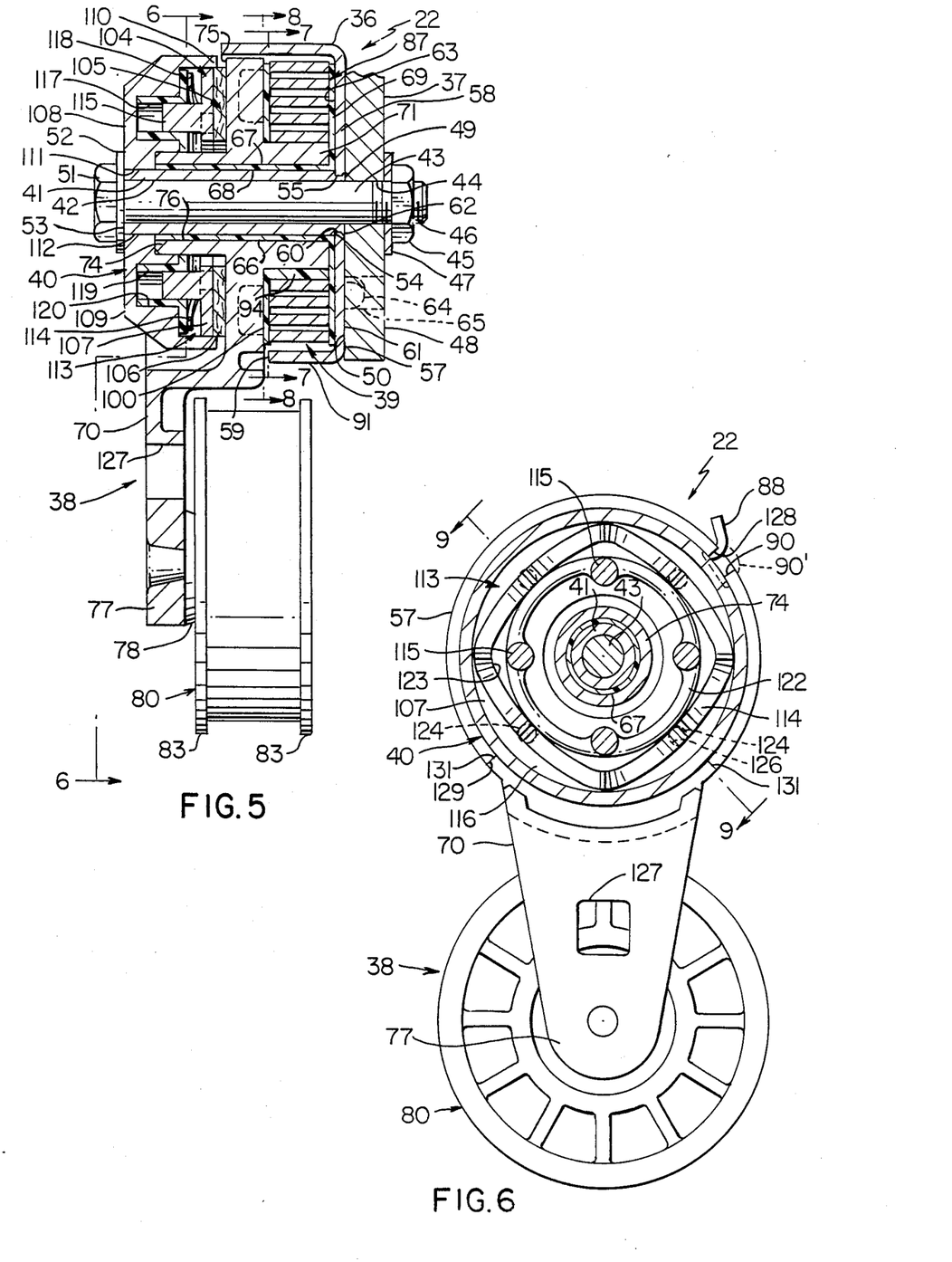
FIG. 5 is a fragmentary cross-sectional view of the belt tensioner of FIG. 3 and is taken on line 5—5 of FIG. 3.
FIG. 6 is a cross-sectional view taken on line 6—6 of FIG. 5.

As best illustrated in FIG. 5, the improved belt tensioner 22 of this invention comprises a support means 36 adapted to be fixed to a mounting bracket 37 of the engine 20 as illustrated in FIGS. 1 and 2. A belt engaging means that is generally indicated by the reference numeral 38 is movably carried by the support means 36 in a manner hereinafter set forth. The tensioner 22 has mechanical spring means that is generally indicated by the reference numeral 39 operatively associated with the support means 36 and the belt engaging means 38 to tend to urge the belt engaging means 38 against the slack side 33 of the belt 21.

The belt tensioner 22 also includes a friction dampening means that is generally indicated by the reference numeral 40 and is operatively associated with the support means 36 and the belt engaging means 38 to dampen movement of the belt engaging means 38 relative to the support means 36 in a manner hereinafter set forth.

The friction dampening means 40 and spring means 39 are coaxially aligned and the support means 36 includes a metallic tubular member or shaft means 41 that has a cylindrical opening 42 passing completely therethrough to receive a fastening bolt 43 that is adapted to fasten the tensioner 22 to the bracket 37 by passing through an opening 44 in the bracket 37 and having a nut 45 threaded on the threaded end 46 thereof to compact a washer 47 against the rear side 48 of the bracket 37 while one end 49 of the tubular member 41 is being compacted against the front side 50 of the bracket 37 by the enlarged head 51 of the bolt or fastening member 43 and its associated washer 52 engaging against the other end 53 of the tubular member or shaft means 41.

In this manner, the tensioner 22 of this invention is adapted to be mounted to the bracket 37 by the single bolt 43 that is inserted through the fastening opening 42 at the front of the tensioner 22, the fastening opening 42 being coaxially disposed through the coaxially aligned friction dampening means 40 and spring means 39 to render the tensioner 22 relatively small and compact.

As best illustrated in FIG. 5, the tubular member 41 has the end 49 thereof defining an annular shoulder 54 with a reduced portion 55 extending from the shoulder 54.

A cup-shaped metallic housing member 57 has a closed end 58 and an open end 59, the closed end 58 having an opening 60 passing therethrough and being adapted to receive the reduced portion 55 of the end 49 of the tubular member 41 therethrough so that the reduced end 55 can be subsequently turned over or staked to the side 61 of the housing 57, the staked portion of the end 49 of the tubular member 41 being indicated by the reference numeral 62 whereby the housing 57 has its side 63 held against the shoulder 54 of the tubular member 41 by the staking 62 so that the housing 57 is fixed to the tubular member 41 and defines part of the support means 36 of the tensioner 22 of this invention as will be apparent hereinafter. Of course, the end 49 of the tubular member 41 could be secured to the closed end wall 58 of the housing member 57 in any other suitable manner, as desired, such as by brazing the housing member 57 to the reduced portion 55 of the shaft means 41.

Figures 3, 4:
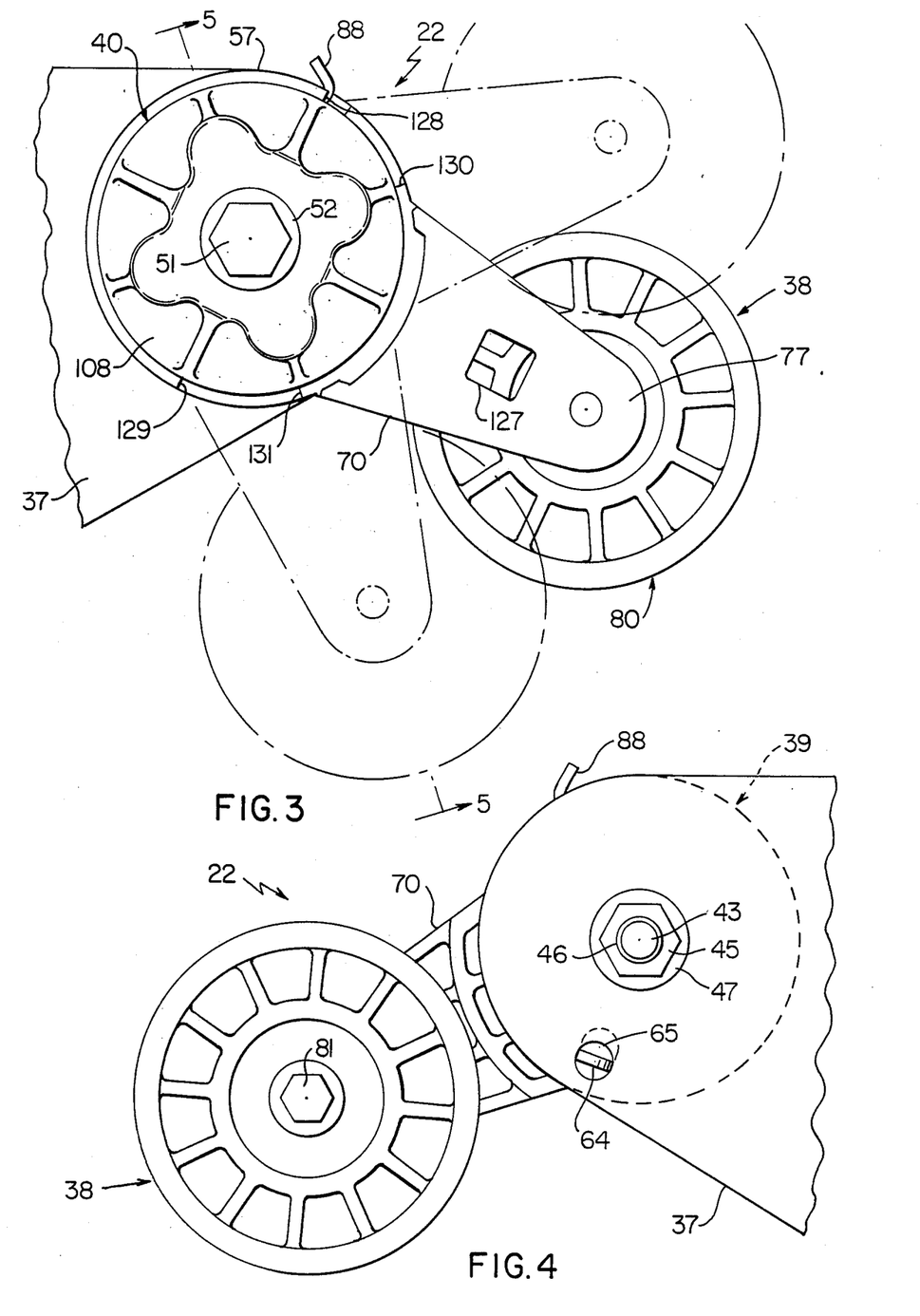
FIG. 3 is an enlarged fragmentary front view of the belt tensioner of this invention that is being utilized for tensioning the power transmission belt of FIGS. 1 and 2 and illustrates various positions thereof.
FIG. 4 is a fragmentary rear view of the belt tensioner of FIG. 3.

When the tensioner 22 is subsequently mounted to the vehicle bracket 37 by the single fastening member or bolt 43 in the manner previously described, rotation of the support means 36 relative to the bracket 37 is prevented by a tang 64 that had been carved from the closed end 58 of the housing 57 and that projects into a suitably located opening 65 in the bracket 37 as illustrated in FIGS. 4 and 5 whereby the housing 57 is prevented from rotating relative to the bracket 37 and, thus, prevents the tubular member or shaft means 41 from rotating relative thereto as the tubular member 41 is fastened to the housing 57 as previously described.

A bearing member 66 comprising a cylindrical tubular portion 67 having a cylindrical opening 68 passing therethrough is telescopically disposed on the tubular member or shaft means 41 of the housing 57 and has a disc end member 69 adapted to be disposed against the closed end wall 58 of the housing member 57 as illustrated, the bearing member 66 being formed of any suitable material, such as an anti-friction plastic material, in order to provide for relative movement of the belt engaging means 38 relative to the fixed shaft means 41 as fully set forth in the aforementioned copending patent application, Ser. No. 581,645, filed Feb. 21, 1984, now U.S. Pat. No. 4,536,172 whereby this patent application is being incorporated into this disclosure by this reference thereto. In addition, the other aforementioned copending patent application, Ser. No. 633,154 filed July 20, 1984, now U.S. Pat. No. 4,624,652 is being incorporated into this disclosure by this reference thereto. Since other bearing means for permitting the belt engaging means to readily move relative to a fixed shaft means is fully disclosed in the copending patent application of Randy C. Foster, Ser. No. 427,074 filed Sept. 29, 1982, now abandoned, this copending patent application is also being incorporated into this disclosure by this reference thereto.

The belt engaging means 38 comprises a metallic pivot arm 70 having a tubular portion 71 extending from one side 72 of an end portion 73 thereof as well as a coaxially disposed tubular portion 74 extending from the other side 75 of the end portion 73, the tubular portions 71 and 74 and end portion 73 having a cylindrical bore 76 passing completely therethrough so as to be adapted to be telescopically disposed on the fixed shaft means 41 with the bearing sleeve 67 disposed therebetween so that the end portion 73 of the arm 70 can rotate or oscillate relative to the fixed shaft means 41 for a purpose hereinafter set forth.

The other end 77 of the pivot arm 70 has a pivot extension 78 adapted to pass through a central opening 79 in a belt pulley or wheel 80 which is fastened thereon by a suitable fastening means 81 being received in a threaded internal bore (not shown) in the end 82 of the projection 78 whereby the wheel 80 is adapted to rotate on the pivot shaft 78 and engage against the belt 21 between the side flanges 83 thereof in a manner well known in the art.

The tubular portion 71 of the pivot arm 70 has a transverse slot 84 formed therein and is adapted to receive an inwardly bent end 85 of an inner coil 86 of a spirally wound flat metallic spring member 87 that comprises the mechanical spring means 39 of the tensioner 22.

The spring member 87 has an outer end 88 bent at an angle relative to an outer coil 89 of the spring 39 and is adapted to be received in a slot 90 formed in an annular side wall 91 of the support housing 57 so as to fasten the outer end 88 of the spring 87 to the support means 36, the inner end 85 of the spring member 87 being interconnected to the arm 70 or belt engaging means 38 to tend to urge the pulley 80 toward the belt 21 with a tensioning force of the spring member 87 in the manner set forth in the aforementioned copending patent applications.

It was found according to the teachings of this invention that the inner end 85 of the torsion spring member 87 at its joint area 92 with the inner coil 86 tends to weaken the inner coil 86 in the area of the reference numeral 93 as it begins to form the next inner coil 94 because the area 93 is held away from the tubular member 71 in a bridging manner as the same wraps around the inner coil 86 adjacent that joint area 92.

However, one feature of this invention is to provide a protective member between the inner coil 86 and the tubular portion 71 of the belt engaging means 38 adjacent the bent inner end 85 of the spring member 87 to tend to minimize such bridging problem.

Figure 7:
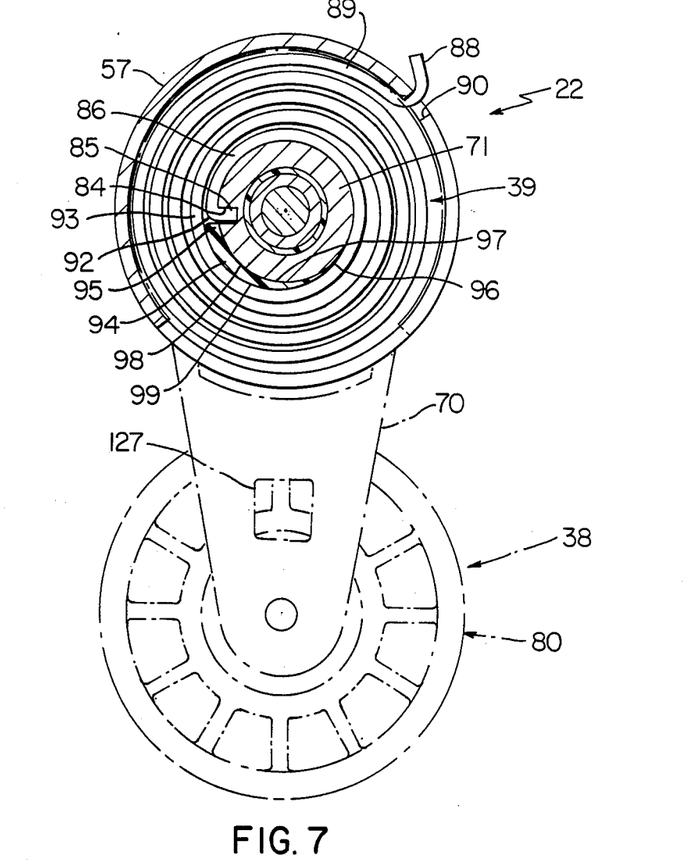
FIG. 7 is a fragmentary cross-sectional view taken on line 7—7 of FIG. 5 and illustrates other parts of the tensioner in dash-dotted lines.
Figure 8:
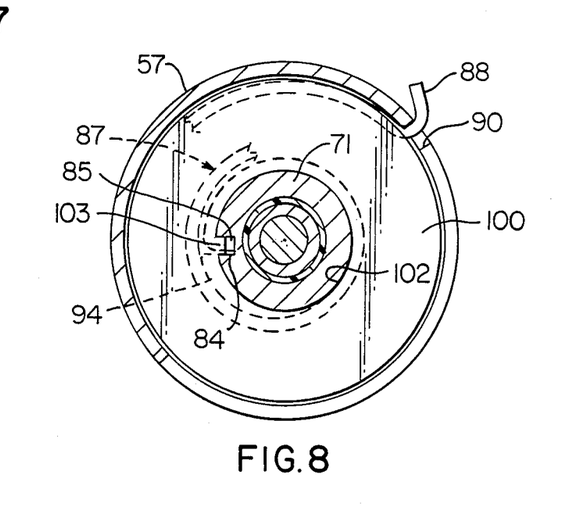
FIG. 8 is a cross-sectional view taken on line 8—8 of FIG. 5.

In particular, a protective arcuate member 94 formed of any suitable polymeric material has a thickened end 95 that tapers to a thinner end 96 and is adapted to have its inner side 97 substantially conform to the outer peripheral surface 98 of the tubular portion 71 as illustrated in FIG. 7 with its end 95 being disposed adjacent the bent end 85 of the coil 87 so that the portion 92 of the inner coil 86 will engage against its outer tapering surface 99 from the end 96 thereof to the end 95 thereof so that no substantial gap exists between the inner coil 86 and the protective member 94 when the inner coil 86 is being wrapped upon itself during winding up of the spring means 87.

The protective member 94 has an integral disc part 100 provided with an opening 102 therethrough which is adapted to be telescopically disposed on the tubular portion 71 of the belt engaging arm 70, the disc part 100 having an inwardly directed tang 103 for being received in the slot 84 of the tubular portion 71 to rotationally orient the protective member 94 as well as prevent rotational movement thereof relative to the tubular member 71 so that the protective member 94 is held in a positive position relative to the bent end 85 of the spring 87 as illustrated in FIG. 7 for the reasons previously set forth.

When the spring means 39 and belt engaging arm 70 are assembled on the bearing sleeve 66 and, thus, on the fixed shaft means 41, it can be seen that the disc end 100 of the protective member 94 and the disc end 69 of the bearing sleeve 66 provide anti-friction material on adjacent sides of the coiled spring member 87 to tend to reduce friction therewith during the winding and unwinding of the spring strip 87 as set forth in the aforementioned copending patent application Ser. No. 581,645, filed Feb. 21, 1984, now U.S. Pat. No. 4,536,172.

The friction dampening means 40 of the tensioner 22 of this invention comprises one part that is generally indicated by the reference numeral 104 in FIG. 5 that is coaxially disposed on the shaft means 41 and is axially movable thereon in a manner hereinafter set forth to cooperate with another part of the dampening means 40 that is generally indicated by the reference numeral 105 and comprises the side 75 of the end portion 73 of the belt engaging arm 70 as will be apparent hereinafter, the one part 104 comprising an annular pad 106 of any suitable friction material, such as conventional brake pad material, and a rigid metallic force plate 107 that backs up the annular pad 106 of friction material.

In addition, the friction dampening means 40 includes a cup-shaped metallic cover member or cap 108 that has a closed end 109 and an open end 110, the closed end 109 having an opening 111 formed centrally therethrough and being press-fitted onto a knurled end portion 112 of the shaft 41 whereby the cover member 108 comprises part of the support means 36 as the same is fixed to the fixed shaft means 41 of the support means 36. The cover member 108, after being press-fitted onto the knurled end 112 of the shaft 41 so as to be non-rotatable relative thereto, is held in its final assembly on the fixed shaft means 41 after the tensioner 22 has been secured to the mounting bracket 37 by the bolt 43 as the washer 52 compacts against the end 53 of the fixed shaft means 41 as well as against the closed end 109 of the cover member 108 as illustrated in FIG. 5.

A spring means, independent of the torsion spring 39 of the tensioner 22, is disposed between the cover member 108 and the part 104 of the friction dampener 40 to urge the part 104 axially on the shaft means 41 and against the other part 105 with a certain spring force to provide for the friction dampening of the movement of the arm 70 relative to the shaft means 41 and, thus, relative to the support means 36 for the same reasons that the aforementioned copending patent applications utilize a rotary fluid dampening means for dampening such movement of the arm 70, such other spring means being generally indicated by the reference numeral 113 and in the embodiment illustrated in the drawings comprising an annular wavy metallic spring member 114 with it being understood that the spring means 113 could comprise a plurality of wavy spring members 114 or other spring means as desired.

It was found according to the teachings of this invention that during operation of the belt tensioner 22, there is normal wear on the pivot bushing 67 during rotation of the belt engaging arm 70 thereon so that the end portion 73 of the arm 70 tends to cock on the shaft means 41 through the worn out bearing sleeve 67 so that in order to assure that the annular pad 106 of the part 104 makes full annular contact with the surface 75 of the end portion 73 of the pivot arm 70, the part 104 of the friction dampening means 40 is provided with spline means 115 that project from the side 116 of the backup plate 107 of the part 104 to be loosely received in suitable spline openings or means 117 formed through a dampener bushing 118 formed of polymeric material and having the tubular portions 119 thereof press-fittingly received in suitable openings 120 formed in the cover 108 so as to hold the bushing 118 from rotation relative thereto. However, because of the loose connection of the projections 115 in the openings 117 as well as through the normal resiliency of the polymeric material forming the part 118, the part 104 of the friction dampening means 40 is adapted to cock relative to the shaft means 41 and thereby apply the full side 121 of the annular friction pad 106 against the surface 75 of the end portion 73 of the pivot arm 70 through the self-aligning relation of the spline means 115 and 117 and the action of the spring means 113 tending to axially move the part 104 relative to the part 105 as previously set forth.

If desired, the side 116 of the backup plate 107 of the part 104 can be provided with an annular projection 122 that is adapted to be received within an opening 123 through the spring member 114 to position the same relative thereto in the manner illustrated in FIG. 6.

While the friction pad 106 can be carried by the backup plate 107 in any suitable manner, the annular pad 106 has projections 124 extending from the side 125 thereof to be respectively received in openings 126 formed through the backup plate 107 so as to interconnect the pad 106 thereto through the spline connections 124 and 126.

In this manner, it can be seen that the annular pad 106 will not rotate relative to the arm 70 as the arm 70 rotates on the shaft means 41 because the annular member 106 is splined to the backup plate 107 through the spline means 124, 126 and the backup plate 107 is, in turn, splined to the bushing 108 through the spline means 115, 117 with the bushing 118 being splined to the fixed cover member 108 through the spline means 119 and 120.

From the above, it can be seen that the various parts of the tensioner 22 of this invention can be readily assembled onto the shaft means 41 of the support means 36 and be held together in the assembled relation thereon by the cover member 108 being press-fitted onto the knurled end portion 112 of the shaft means 41 as illustrated in FIG. 5.

The operation of the belt tensioner 22 of this invention will now be described.

When it is desired to mount the tensioner 22 of this invention to the engine 20, the tensioner 22 is placed adjacent the bracket 37 with the spring means 39 having the pivot arm 70 in such a position that the pulley wheel 80 is disposed in a position that the arm 70 will have to be rotated in a counterclockwise direction in FIG. 3 in order to place the pulley 80 on the belt 21. The tensioner 22 is so disposed against the bracket 37 that the projection 64 of the housing 57 is received in the opening 65 of the bracket 37. At this time, the fastening member or bolt 43 is inserted through the opening 42 in the tubular member or shaft means 41 to project through the opening 44 in the bracket 37 and have the nut 45 threaded on the threaded end 46 thereof to compact the tensioner 22 between the head 51 of the bolt 43 and the side 50 of the bracket 37 in the manner previously described so that the support means 36 of the tensioner 22 is fixed to the bracket 37 and thereby fixed relative to the belt 21.

Thereafter, the pulley 80 and the arm 70 are rotated in a counterclockwise direction in FIG. 3 so as to place the pulley 80 onto the belt 21 as illustrated in FIGS. 1 and 2 and is illustrated by the intermediate full line position in FIG. 3 so that the torsion spring 87 is wound up and is tending to urge the pulley 80 in a clockwise direction against the belt 21, such adjustment of the pulley 80 onto the belt 21 being facilitated by a suitable tool being inserted into a rectangular opening 127 formed in the arm 70 so that the arm 70 can be rotated to place the pulley 80 onto the belt 21 in opposition to the force of the torsion spring 87.

Accordingly, in all operating positions of the arm 70 of the belt engaging means 38 as represented by the full lines and phantom lines in FIG. 3 of the drawings, the torsion spring 87 has a force tending to move the belt engaging means 38 in a clockwise direction beyond even the lowest position illustrated in FIG. 3 so as to always provide a tensioning force on the belt 21.

The movement of the belt engaging arm 70 relative to the support means 36 is limited by stop edges 128 and 129 formed on the annular part 91 of the support member 57 and against which cooperating shoulders 130 and 131 on the arm 70 will engage to thereby limit the rotational movement of the arm 70 in both directions on the shaft means 41.

Accordingly, assuming that the belt engaging means 38 is in the full line position illustrated in FIG. 3 against the belt 21 and a normal oscillation of the belt 21 during the operation of the engine 20 for the reasons previously set forth causes the belt engaging means 38 to move further inwardly toward the belt 21 in a clockwise direction in FIG. 3, such clockwise movement of the arm 70 causes the end portion 73 to rotate in a clockwise direction relative to the stationary surface 121 of the pad 106 of friction material so that the friction material 106 through the urging of the spring means 113 tends to retard such rotary movement of the belt engaging arm 70 so as to dampen the movement of the belt engaging means 38 toward the belt 21. Conversely, should the fluctuation of the belt 21 cause the belt engaging means 38 to move in a counterclockwise direction away from the belt 21 as illustrated in FIG. 3, such movement of the arm 70 causes the surface 75 of the end portion 73 thereof to rotate relative to the stationary surface 121 of the friction pad 106 so that the friction pad 106 tends to retard such movement of the arm 70 so as to dampen such oscillation of the belt 21 for the reasons previously set forth.

Therefore, it can be seen that the tensioner 22 provides for friction dampening of the movement of the belt engaging means 38 relative to the support means 36 so as to prevent early wearout of the mechanical spring means 39 that is operatively interconnected to the support means 36 and the belt engaging means 38 in the manner previously set forth.

Also, it can be seen that since the friction dampening means 40 and mechanical spring means 39 of the tensioner 22 of this invention are coaxially aligned on the fixed shaft means 41, such arrangement renders the tensioner 22 substantially small and compact while still permitting the single fastening member 43 to secure the tensioner 22 to the bracket 37 in the manner previously set forth.

It is to be understood that the dampening characteristics of the friction dampening means 40 of the tensioner 22 of this invention can be provided through variations in the material forming the pivot arm 70, surface preparation of the surface 75 of the arm 70, the particular friction material forming the pad 106, the total contact area between the pad 106 and the surface 75 of the arm 70 and the amount of spring force provided by the spring means 113.

While the belt tensioner 22 of this invention has been previously described as having the part 104 move against the surface 75 of the belt engaging arm 70, it is believed that the part 104 could be carried in a splined manner by the belt engaging arm 70 to rotate therewith and engage against a suitable stationary surface on the cover member 108 if desired.

Figures 9, 11, 12:
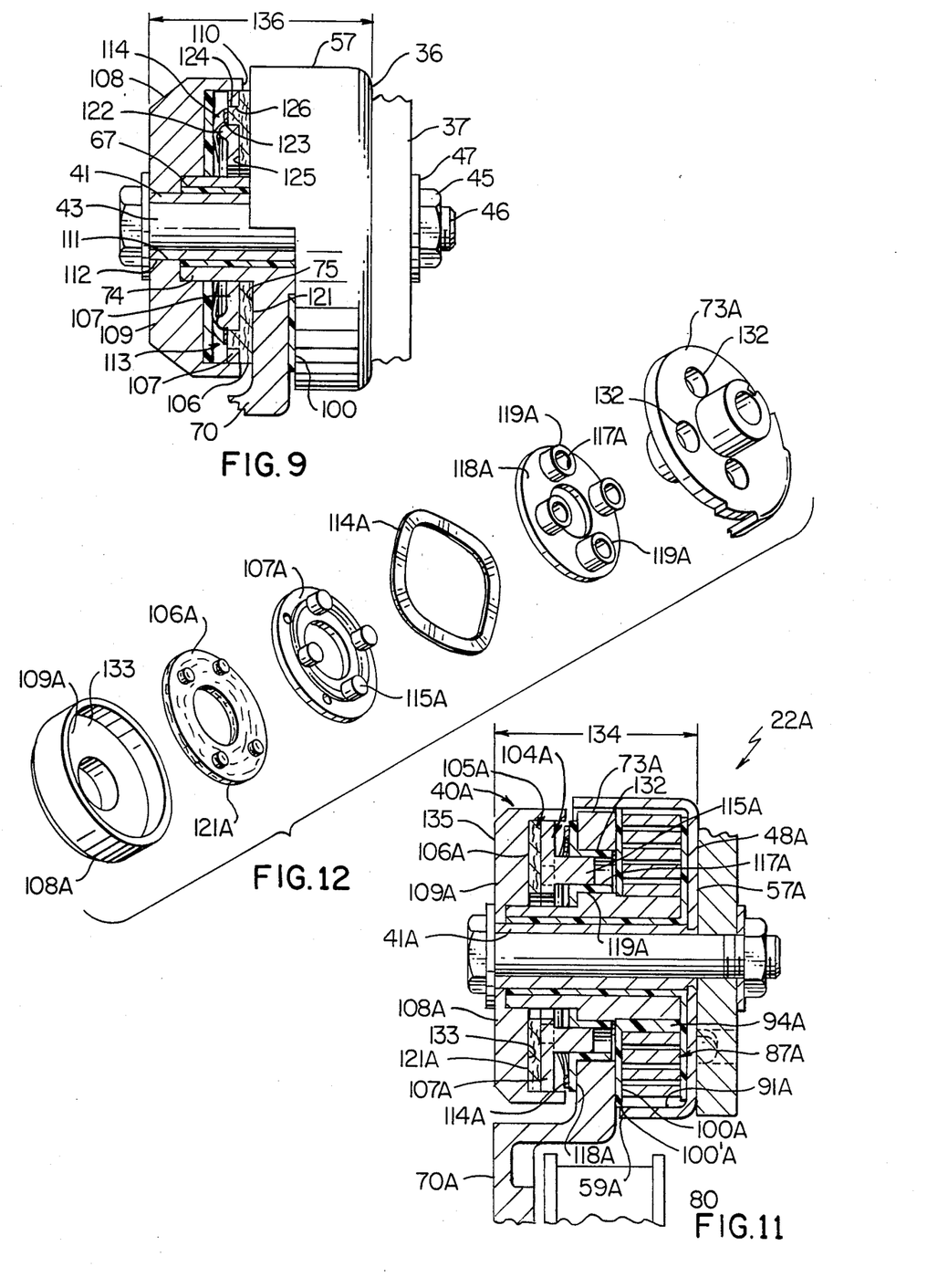
FIG. 9 is a fragmentary cross-sectional view taken on line 9—9 of FIG. 6, FIG. 9 being partially in elevation.
FIG. 11 is a fragmentary view similar to FIG. 5 and illustrates another embodiment of the belt tensioner of this invention.
FIG. 12 is an exploded perspective view of certain of the parts of the belt tensioner of FIG. 11.
Figure 10:
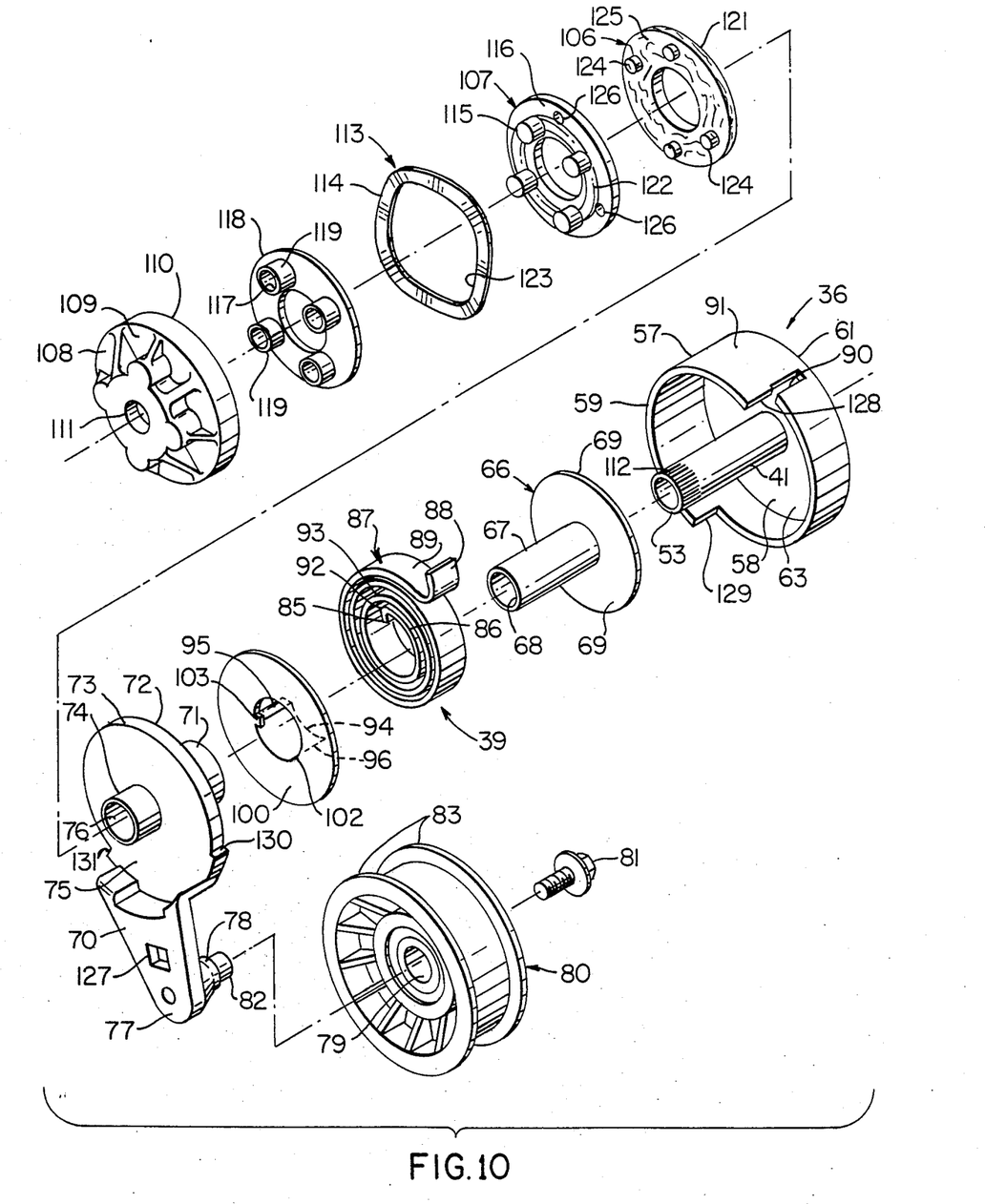
FIG. 10 is an exploded perspective view illustrating the various parts of the belt tensioner of FIGS. 1-9.

For example, such a tensioner is generally indicated by the reference numeral 22A in FIGS. 11 and 12 and parts thereof similar to the tensioner 22 previously described are indicated by like reference numerals followed by the reference letter "A".

As illustrated in FIGS. 11 and 12, the end portion 73A of the belt engaging arm 70A is provided with a plurality of openings 132 passing therethrough which are adapted to receive the tubular splines 119A of the plastic bushing 118A which in turn have the splined projections 115A of the backup plate 107A received in the openings 117A thereof in a loose manner so that the backup plate 107A can self-align its annular pad 106A relative to the bushing 118A to have its surface 121A bear against a fixed surface 133 formed on the inside of the closed end wall 109A of the cover member 108A that is fastened to the tubular member 41A in the manner previously set forth.

The friction dampener 40A of the tensioner 22A includes one or more wavy springs 114A disposed between the bushing 118A and the backup plate 107A to urge the surface 121A of the annular friction pad 106A against the surface 133 of the cover member 108A to dampen movement of the belt engaging arm 70A as the annular pad 106A rotates therewith relative to the surface 133 for the same dampening purposes previously set forth.

It is believed that by arranging the part 104A of the friction dampening means 70A to be carried by the arm 70A and the part 105A of the friction dampening means 40A to be the surface 133 of the cover 108A, the overall dimension 134 provided between the outside surfaces 48A and 135 of the cover member 108A as illustrated in FIG. 11 is smaller than the similar dimension 136 illustrated in FIG. 9 where the part 104 of the friction dampening means 40 is splined to the cover member 108.

It can also be seen in FIG. 11 that the tensioner 22A has the disc portion 100A of the protective member 94A with an outside peripheral surface 100'A that is disposed in substantially sealing relation with the internal peripheral surface 91'A of the housing member or casing 57A to substantially seal closed the open end 59A of the housing 57A adjacent the spring 87A. If desired, the disc member 100A could be provided with a rounded edge or even an arcuate annular rib that will extend into the housing member 57A along the surface 91'A to assure such substantially sealing relation whereby dust and the like will be prevented from reaching the spring 87A during the operation of the tensioner 22A. In this regard, a suitable snap-in plug, formed of polymeric material or the like, can be snap-fitted into the slot 90 of the housing member 57 as illustrated in FIG. 6 by the dotted lines 90' so as to seal closed the slot 90 after the end 88 of the spring 87 has been assembled in the slot 90 whereby such casing 57 would be further sealed in a closed condition thereof.

Therefore, it can be seen that the disc member 100A of the tensioner 22A not only serves the purpose of holding the end 73A of the arm 70A out of contact with the spring 87A and provide an anti-friction means against the spring 87A, but also the disc member 100A substantially seals closed the housing member 57A to prevent dust and the like from reaching the spring 87A thereof. Of course, it is to be understood that the disc part 100 of the tensioner 22 previously described could be made larger for this same sealing purpose.

Also, while one form of housing member 57 has been provided for the support means 36, it is to be understood that other configurations can be utilized.

For example, the tubular member or shaft means 41 could be cast in either a casting for the support means 36 or in a casting for the cover member 108 for the friction dampening means 40.

Figure 13:
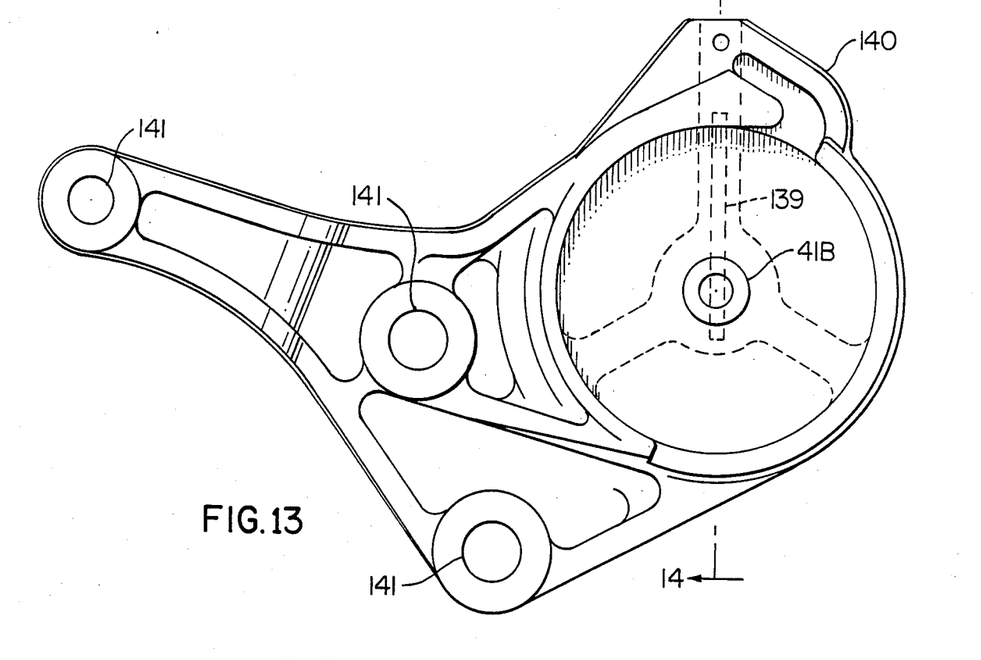
FIG. 13 is a front view of a support member of another embodiment of the belt tensioner of this invention.
Figure 14:
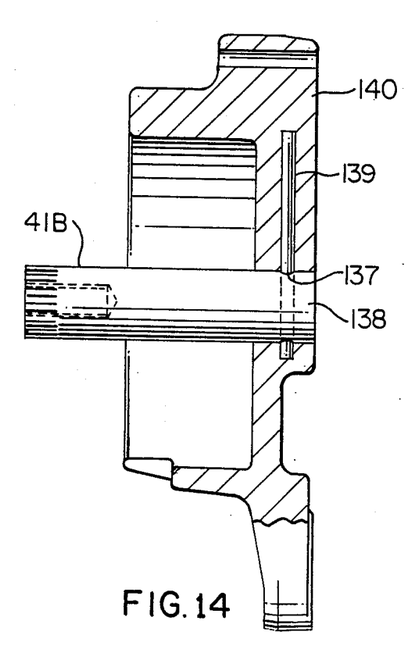
FIG. 14 is a cross-sectional view taken on line 14-14 of FIG. 13.

For example, reference is now made to FIGS. 13 and 14 wherein a tubular member or shaft means 41B has an opening 137 passing through the end 138 thereof and having a cross pin 139 disposed therein, the end 138 and cross pin 139 being disposed in a metallic casting 140 that was cast around the same and forms a support means for a tensioner in such a manner that the same is adapted to be bolted to the engine by suitable fastening means passing through openings 141 thereof in any suitable manner so that the remaining parts of the tensioner 22 of this invention can be assembled on the tubular member 41B in the manner previously set forth to form a tensioner to operate in the manner of the tensioner 22 previously described.

Figure 15:
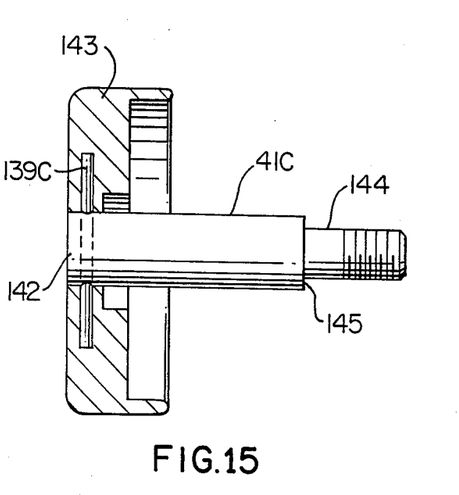
FIG. 15 is a view similar to FIG. 14 and illustrates another support member of another embodiment of the belt tensioner of this invention.

Likewise, it can readily be seen in FIG. 15 that the shaft means 41C can have the cross pin 139C in the end 142 thereof and be cast in a casting 143 which will form the cover member of the friction dampening means 40 previously described. The shaft means 41C can be hollow so as to have a single bolt mount the same to the engine bracket means or the shaft means 41C can be solid and have an externally threaded reduced end 144 which will provide the sole means for securing the shaft means 41C to a mounting bracket of an engine or the like. A cover member for the torsion spring of such a tensioner can abut against a shoulder 145 of the shaft means 41C so as to limit the compaction between the cover member 143 and the shoulder 145 during the assembly of the tensioner parts thereon.

Therefore, it can be seen that various modifications can be made in the various parts of this invention to provide an improved belt tensioner of this invention.

Thus, it can be seen that this invention not only provides an improved belt tensioner, but also this invention provides an improved method of making such a belt tensioner.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a tensioner for a power transmission belt that is adapted to be operated in an endless path, said method comprising the steps of forming a support means for being fixed relative to said belt, forming a belt engaging means to be carried by said support means and be movable relative thereto, operatively associating mechanical spring means with said support means and said belt engaging means for urging said belt engaging means relative to said support means and against said belt with a force to tension said belt, forming said spring means to have a longitudinal axis and be spiraled about said axis thereof, forming said support means to comprise a shaft means having a longitudinal axis and fixed from movement relative to said belt engaging means, forming said belt engaging means to have a portion thereof rotatably carried by said shaft means so as to rotate relative to said shaft means, forming said support means to comprise a cup-shaped casing having an open end receiving said spring means therein, and disposing an antifriction disc-like member on said shaft means between said portion of said belt engaging means and said spring means, the improvement comprising the step of forming said disc-like member to substantially seal closed said open end of said casing whereby said disc-like member performs a dual function.

* * * * *